(12) United States Patent
Loose

(10) Patent No.: US 7,443,435 B2
(45) Date of Patent: Oct. 28, 2008

(54) COLUMN AMPLIFIER WITH AUTOMATIC GAIN SELECTION FOR CMOS IMAGE SENSORS

(75) Inventor: Markus Loose, Thousand Oaks, CA (US)

(73) Assignee: AltaSens, Inc., Westlake Village, CA (US)

( * ) Notice: Subject to any disclaimer, the term of this patent is extended or adjusted under 35 U.S.C. 154(b) by 747 days.

(21) Appl. No.: 10/886,319

(22) Filed: Jul. 7, 2004

(65) Prior Publication Data
US 2008/0136952 A1 Jun. 12, 2008

(51) Int. Cl.
H04N 3/14 (2006.01)
H04N 5/335 (2006.01)
H03G 3/00 (2006.01)
H03G 3/10 (2006.01)

(52) U.S. Cl. ............ 348/294; 348/300; 348/301; 348/229.1; 348/302; 348/308; 330/278; 330/279

(58) Field of Classification Search ......... 330/278–285; 348/294–324
See application file for complete search history.

(56) References Cited

U.S. PATENT DOCUMENTS

| 6,486,808 | B1 | 11/2002 | Seppi et al. | |
|---|---|---|---|---|
| 6,498,927 | B2* | 12/2002 | Kang et al. | 455/245.2 |
| 6,707,492 | B1* | 3/2004 | Itani | 348/229.1 |
| 6,757,018 | B1* | 6/2004 | Fowler | 348/301 |
| 6,829,007 | B1* | 12/2004 | Bilhan et al. | 348/243 |
| 6,940,553 | B1* | 9/2005 | Katoh | 348/311 |
| 7,042,285 | B2* | 5/2006 | Parkhurst et al. | 330/140 |
| 7,079,178 | B2* | 7/2006 | Hynecek | 348/222.1 |
| 7,123,301 | B1* | 10/2006 | Nakamura et al. | 348/301 |
| 7,349,017 | B2* | 3/2008 | Tan et al. | 348/301 |
| 2002/0134918 | A1 | 9/2002 | Miida | |
| 2003/0080340 | A1 | 5/2003 | Henderson et al. | |
| 2004/0041927 | A1* | 3/2004 | Cho et al. | 348/254 |
| 2004/0080637 | A1* | 4/2004 | Nakamura et al. | 348/255 |
| 2004/0104771 | A1* | 6/2004 | Dauphinee et al. | 330/129 |
| 2005/0259167 | A1 | 11/2005 | Inoue et al. | |
| 2007/0103569 | A1* | 5/2007 | Kawahito | 348/241 |

OTHER PUBLICATIONS

Shoji Kawahito, et al., A Column-Based Pixel-Gain-Adaptive CMOS Image Sensor For Low-Light-Level Imaging; ISSCC 2003/Session 12/CMOS Imagers, Sensors And Displays/Paper 12.7; (10 pages).

* cited by examiner

*Primary Examiner*—David Ometz
*Assistant Examiner*—Pritham Prabhakher
(74) *Attorney, Agent, or Firm*—Reed Smith LLP

(57) ABSTRACT

A column amplifier architecture having automatic gain selection for CMOS image sensors, which reduces the effect of analog noise, while maintaining a system's dynamic range. A comparator compares an amplified column buffer output signal to a reference voltage. The output of the comparator controls the gain of the amplifier based on the result of the comparison. Initially, a high column buffer gain is selected. For small signals, the output of the column buffer stays below the reference voltage and the output signal stays within the system's dynamic range. For larger signals, the column buffer output will exceed the reference voltage (and also the system's dynamic range) and therefore the comparator output switches states, which selects the low-gain setting. Multiple gain levels may be implemented, if desired.

20 Claims, 5 Drawing Sheets

COLUMN AMPLIFIER WITH AUTOMATIC GAIN SELECTION FOR CMOS IMAGE SENSORS

BACKGROUND OF THE INVENTION

1. Field of the Invention

The present invention relates generally to automatic gain selection circuits, and more particularly to a column amplifier having automatic gain selection for CMOS image sensors.

2. Description of the Related Art

In order to design improved CMOS image sensors for low light sensitivity, excellent low noise performance is desired. Besides the noise generated directly in each pixel, the noise contribution of all subsequent analog processing stages must be considered as well. To minimize the impact of these system noise sources, it is beneficial to amplify each pixel sensor signal as early as possible in the image sensor. Early amplification leads to an improved signal-to-noise ratio, since the signal is amplified, but the noise of the system components after the amplification stage is not. The problem with signal amplification, however, is that large signals, when amplified, can end up being outside of the dynamic range of the sensor In other words, signal amplification reduces the over-all dynamic range of the system.

One prior attempt to solve this problem is disclosed by S. Kawahito et al., *A Column-Based Pixel-Gain-Adaptive CMOS Image Sensor for Low-Light_Level Imaging*, Proc. of IEEE International Solid-State Circuits Conference (ISSCC), 2003, San Francisco, Volume 46, Page 224. As shown in FIG. 1, a comparator compares the pixel signal directly with a reference signal, in order to determine whether or not to amplify the signal. If the signal is below a certain threshold, the signal is amplified, otherwise it is not. However, there are many non-uniformities from pixel to pixel in an image sensor, making it difficult to select an appropriate threshold for the amplification decision, or requiring a unique threshold for each pixel.

Therefore, it would be desirable if a selective amplification could be applied to the pixel signals in an image sensor, wherein the amplification decision is less dependent on the non-uniformities of the pixels.

SUMMARY OF THE INVENTION

In general, the present invention is a column amplifier architecture having automatic gain selection for CMOS image sensors. In one embodiment, a comparator compares an amplified column buffer output signal to a reference voltage. The output of the comparator controls the gain of the amplifier based on the result of the comparison. Initially, a high column buffer gain is selected. For small signals, the output of the column buffer stays below the reference voltage and the output signal stays within the system's dynamic range. For larger signals, the column buffer output will exceed the reference voltage (and also the system's dynamic range) and therefore the comparator output switches states, which selects the low-gain setting.

The switching of the comparator output reduces the gain of the column buffer such that the amplified signal returns back to be within the allowed operating range. If desired, the process can be repeated through several gain steps (i.e. high, medium, low). Also, several comparators and reference voltages could be utilized at the same time in order to determine an optimum gain setting. As a result of the architecture of the present invention, the signal will always be amplified with the maximum gain possible, thereby reducing the effect of noise from other system components.

Additionally, the comparator outputs a range output signal, used to identify to downstream processing blocks, which gain setting was used for the corresponding pixel output signal. After additional processing by other analog stages, such as a line driver, a programmable gain amplifier and an analog-to-digital converter, a digital correction stage attenuate the amplified signals as directed by the range output signal from the comparator.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

In general, a CMOS image sensor comprises a plurality of pixels arranged in rows and columns. For example, in a typical HDTV video application, a sensor may comprise 1920 columns and 1080 rows. Signals from the pixels are typically read-out of the sensor on a column by column basis. Each column may include a column buffer to amplify the small analog signals from each pixel. The present invention provides a multi-gain amplification with automatic gain selection directly in the column buffers. Since the column buffer is the first analog stage after the pixel, the benefit of amplification is maximized. The noise contribution of all the following circuits is thus reduced. While the present invention is described herein with respect to reading the pixel signals out on a column basis, the present invention could also be advantageously applied to systems that read out the pixel signals on a row basis, or even systems which multiplex several columns into a single column buffer amplifier circuit.

Figure 2:
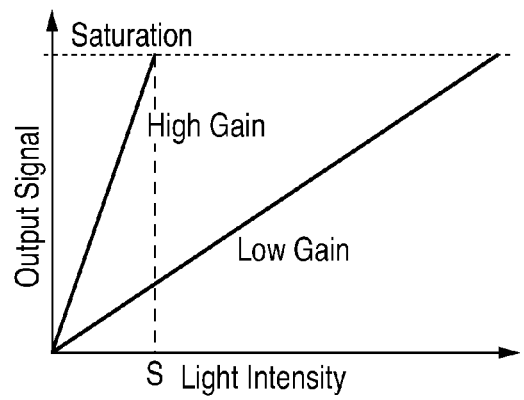
FIG. 2 is a graph illustrating the limiting effect of gain on the dynamic range of a system.
Figure 3:
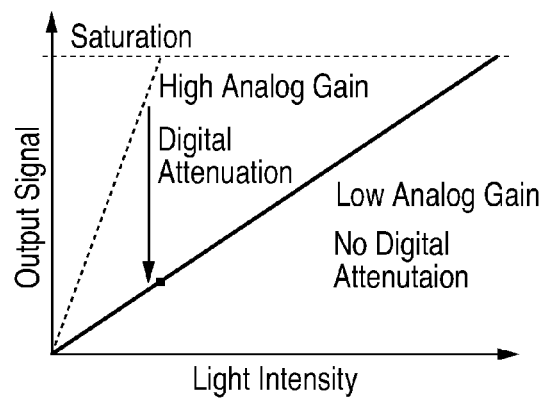
FIG. 3 is a graph illustrating how the present invention can be utilized to digitally attenuate an amplified signal later in processing to overcome to avoid limiting the dynamic range of an image sensor.

As illustrated in FIG. 2, if a single high-gain amplifier were used to amplify each signal from the pixels, the dynamic range of the system would be greatly reduced, since the output signals would quickly reach the saturation limit of the system. Therefore, it would be desirable to amplify the small signals below point S on the graph with a high-gain, but only amplify the signals above point S with a low or no-gain amplifier. After the signals are processed by the other analog system components, the analog signal may be digitized and a digital attenuation stage can "map" the amplified small signals back into the original domain, as shown in the graph of FIG. 3.

Figure 4:
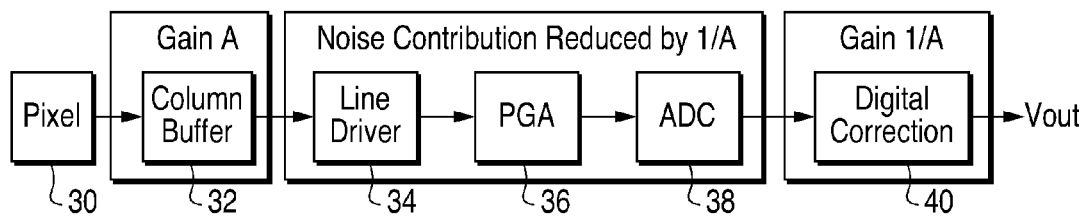
FIG. 4 is a block diagram of the system architecture of the present invention.

FIG. 4 illustrates the signal processing blocks according to one embodiment of the present invention, which may be used in a digital video application, such as for an HDTV video camera. A pixel signal 30 is read-out to a column buffer 32 and amplified by a gain factor "A." According to the present invention, if the amplified signal is below a certain threshold, then it is passed to a line driver 34. However, if the amplified signal is above a certain threshold, then the unamplified signal is passed to the line driver 34. Alternatively, a lower gain amplification may be applied to the signal, if the high-gain would place the signal above the threshold value. In fact, several different gain "levels" could be implemented, each having a different threshold value as desired.

Next a programmable gain amplifier (PGA) 36 further amplifies the signal as determined by the over-all light conditions and system parameters. An analog-to-digital converter (ADC) 38 then converts the analog signal to a digital signal. Note that the noise contributions of the line driver 34, PGA 36, and ADC 38 are reduced by 1/A for the signals amplified at the column buffer stage. Finally, a digital correction stage 40 reduces the amplified signals by a gain factor of 1/A. Thus, the present invention effectively reduces the noise contribution of the analog processing blocks for small signals, without adversely affecting the dynamic range of the system.

In this example, the total noise of the system comprises:

$$v^2 = v^2_{pixel} + v^2_{colbuf} + v^2_{LD} + v^2_{PGA} + v^2_{ADC} + v^2_{crosstalk} \quad \text{(Eqn. 1)}$$

Applying a gain factor of A in the column buffer, lead to:

$$v^2 = [A^2 * (v^2_{pixel} + v^2_{colbuf}) + v^2_{LD} + v^2_{ADC} + v^2_{crosstalk}]/A^2 \quad \text{(Eqn. 2)}$$

$$= v^2_{pixel} + v^2_{colbuf} + (v^2_{LD} + v^2_{PGA} + v^2_{ADC} v^2_{crosstalk})/A^2 \quad \text{(Eqn. 3)}$$

$$V_{out} = (V_{pixel} * A)/A = V_{pixel} \quad \text{(Eqn. 4)}$$

Thus, the noise contributions of the line driver, PGA, ADC and crosstalk are reduced by 1/A, and the SNR ($V_{out}/\sqrt{v^2}$) is improved.

Figure 5:
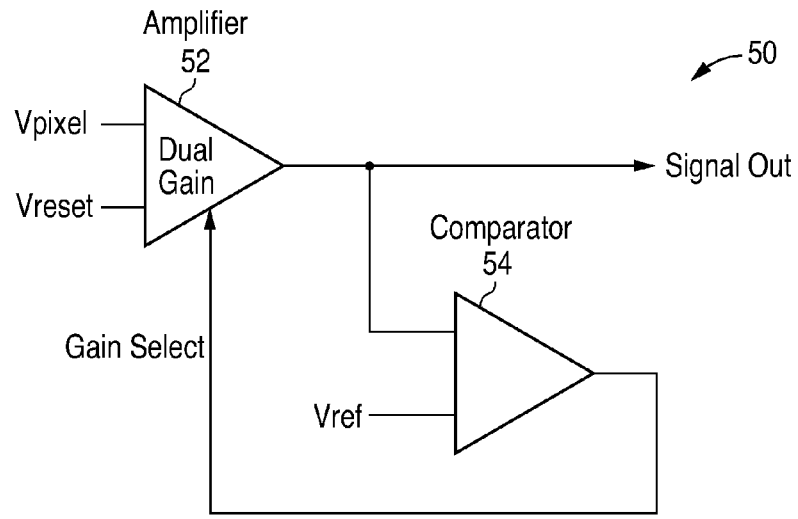
FIG. 5 is a simplified schematic of an automatic gain selection circuit according to the present invention.

A high-level schematic of an automatic gain selection circuit 50 utilized in each column buffer is shown FIG. 5. A comparator 54 compares the amplified column buffer 52 output to a reference voltage $V_{ref}$. The output of the comparator 54 controls the gain of the amplifier 52 based on the result of the comparison. The basic operation of the circuit 50 is as follows. Initially, a high column buffer gain is selected. For small signals, the output of the column buffer 52 stays below the reference voltage $V_{ref}$ and the output signal stays within the system's dynamic range. For larger signals, the column buffer output will exceed the reference voltage $V_{ref}$ (and also the system's dynamic range) and therefore the comparator 54 output switches states. In this embodiment, the amplifier is a dual-gain amplifier. Small signals are amplified with a high-gain, whereas signals above $V_{ref}$ are amplified with a unity or low-gain.

The switching of the comparator 54 output reduces the gain of the column buffer 52 such that the amplified signal returns back to be within the allowed operating range. If desired, the process can be repeated through several gain steps (i.e. high, medium, low). Also, several comparators and reference voltages could be utilized at the same time in order to determine an optimum gain setting. As a result of the architecture of the present invention, the signal will always be amplified with the maximum gain possible, thereby reducing the effect of noise from other system components.

Figure 1:
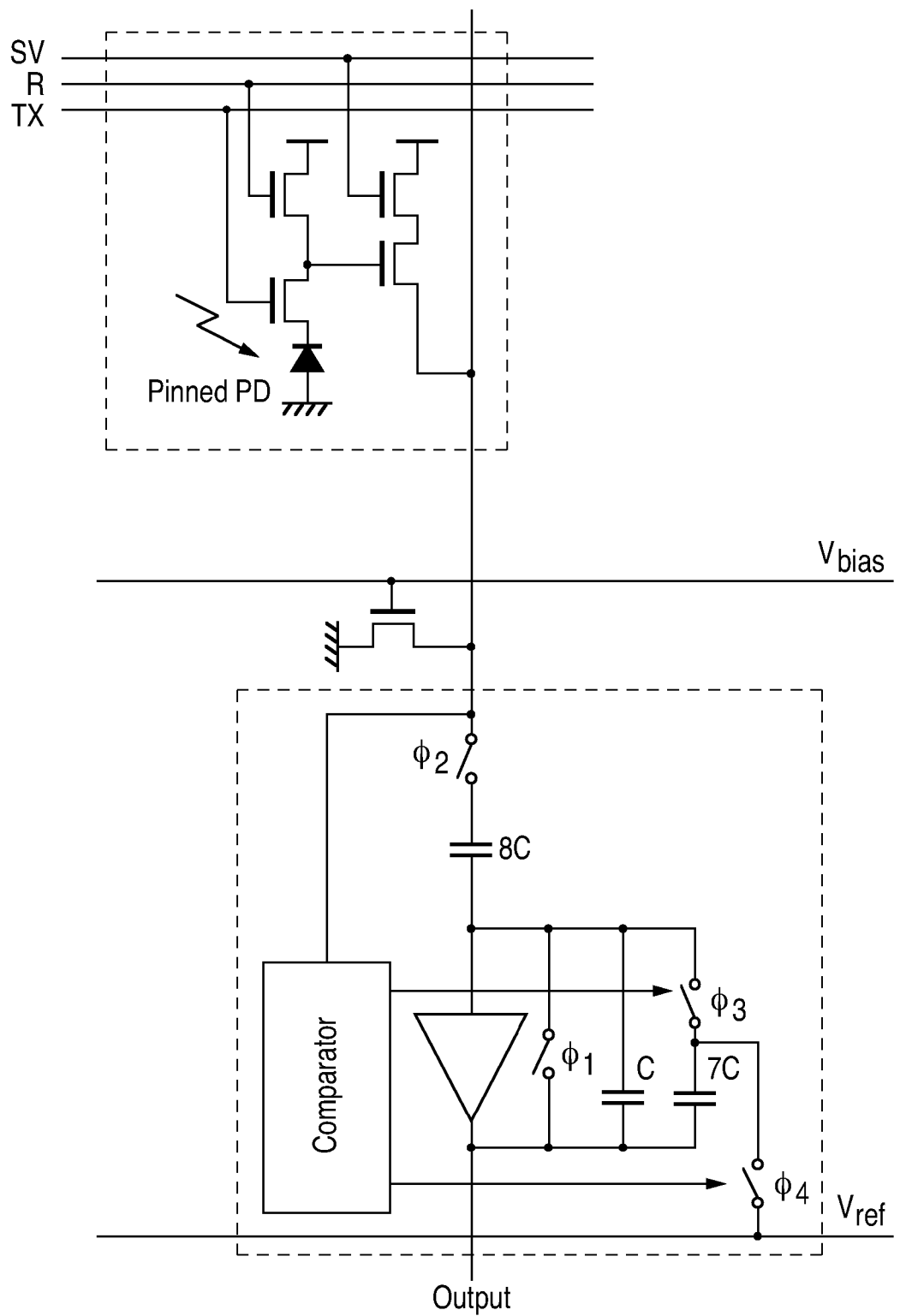
FIG. 1 is a schematic of a prior art circuit.

Note that in contrast to the Kawahito et al. solution discussed above with reference to FIG. 1, the comparator 54 is not comparing the pixel signal $V_{pixel}$ directly, but is instead comparing the amplified signal of the column buffer 52 with a reference signal $V_{ref}$. The present architecture provides two significant advantages over the circuit of FIG. 1

1. Since the signal has already been "double-sampled" the non-uniformities of the pixels have been virtually eliminated. Therefore, the comparator decision is based on the actual integrated signal charge on each pixel, but not on the pixel-to-pixel variations.

2. Since the comparison is performed after a high-gain amplification, the sensitivity versus inaccuracies of the reference voltage or the comparator offsets is greatly reduced. Although the comparator offset is negligible to the first order, a low offset helps to reduce second order effects later in the data reconstruction process, and also avoids column non-uniformities at the transition point from one gain domain to the next.

Figure 6:
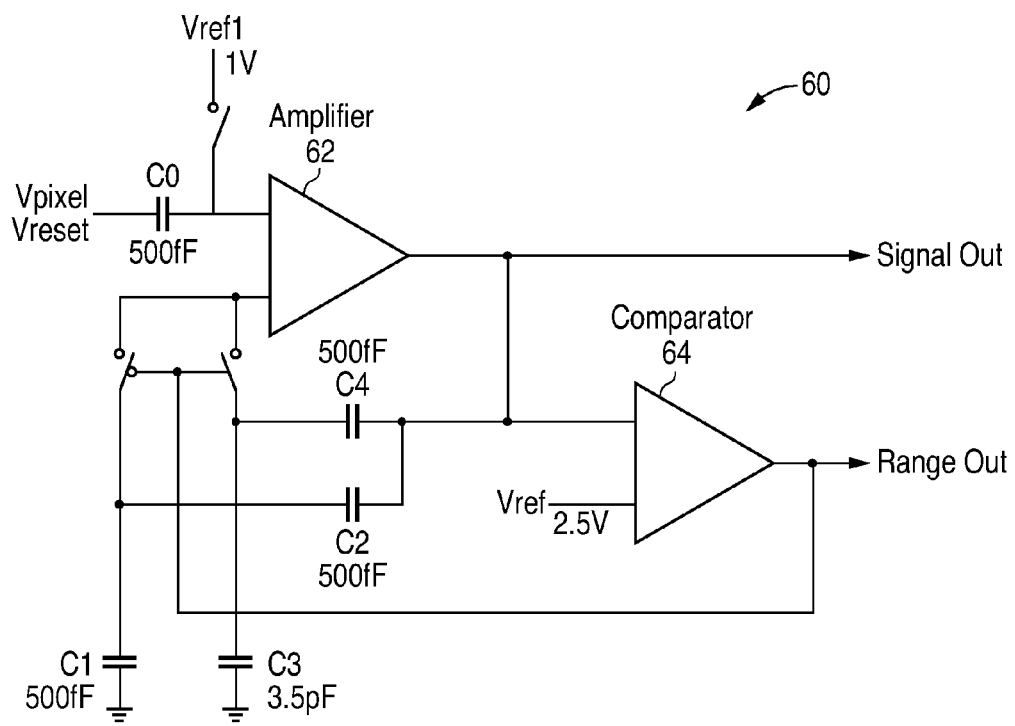
FIG. 6 is a more detailed schematic of one embodiment of an automatic selection circuit according to the present invention.

A more detailed schematic of one possible switched capacitor implementation of the automatic gain selection circuitry is shown in FIG. 6. The preferred component values are shown for a dual-gain circuit 60, having gain settings of 2 and 8. In other words, small signals are amplified by a factor of 8, whereas larger signals above $V_{ref2}$ are amplified by a factor of 2. The high-gain is set by [1+C3/C4] and the low-gain is set by [1+C1/C2]. Also, this circuit performs double sampling on C0 ($V_{reset}$-$V_{pixel}$) The nominal power supply voltage for this circuit 60 is 3.3 volts.

The amplifier 62 and the comparator 64 may be implemented as operational amplifiers, using a folded cascode architecture. In order for the digital correction stage 40 (FIG. 4) to know which signals need to be attenuated, a "Range Out" flag is generated by the comparator 64. In a system with only two gain settings, this flag can be a single bit. For each pixel signal processed, the digital correction stage 40 checks the Range Out flag to determine with the signal needs to be attenuated or not. For implementations with more than two gain settings, the flag may constitute multiple bits, as appropriate. In such embodiments, the digital correction stage 40 could perform different levels of signal attenuation, corresponding to the multiple levels of gains.

Figure 7:
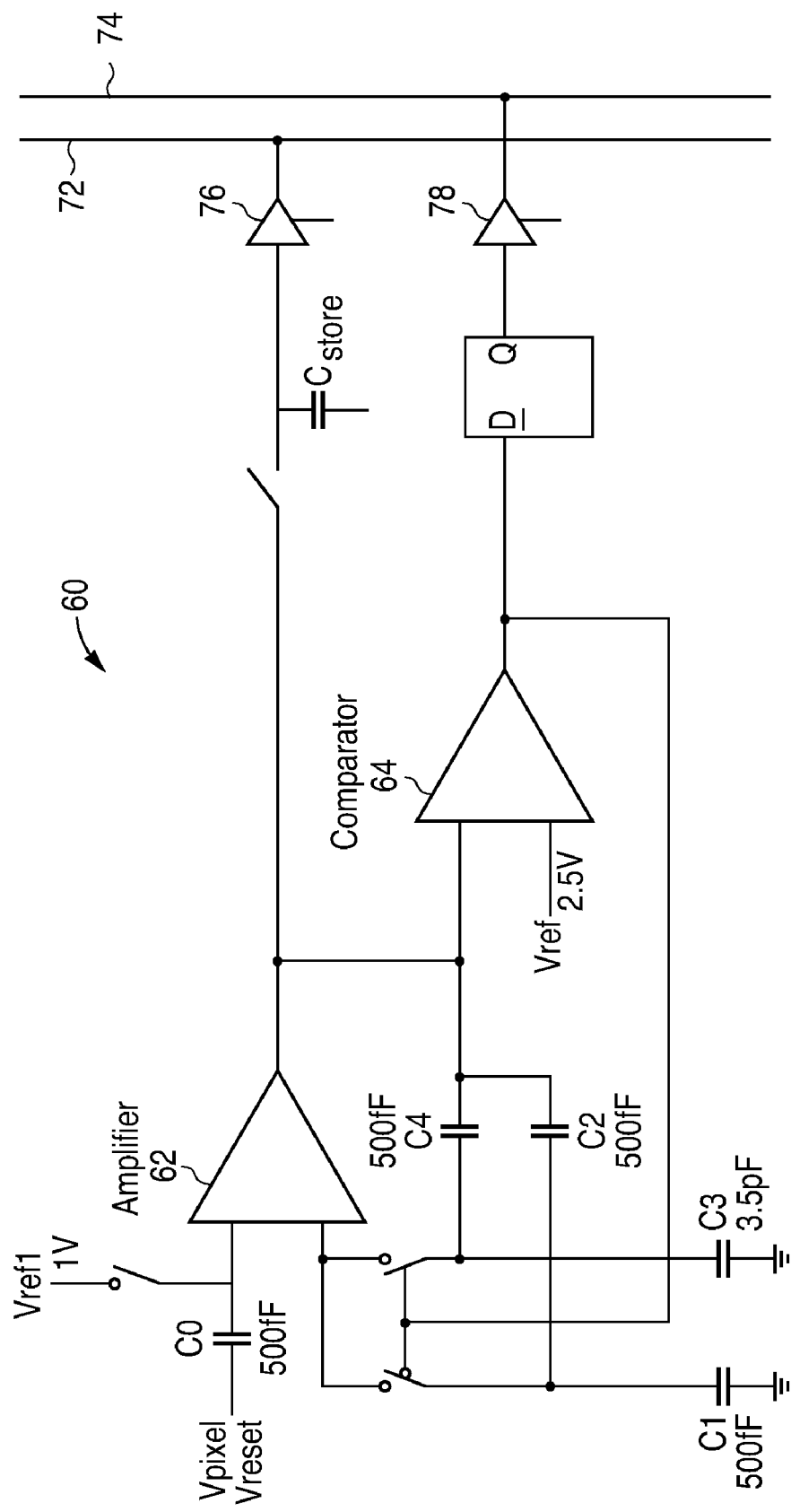
FIG. 7 is a schematic showing one embodiment of the present invention having a sample-and-hold stage.

The circuit of FIG. 6, may be further enhanced as shown in FIG. 7. The outputs of the amplifier 62 and the comparator 64 may be stored in a capacitor $C_{store}$ and a latch D, respectively. This allows the next pixel signal to be read out, while the current signals are waiting to be transmitted on the respective bus lines 72, 74, via the tri-state buffers 76, 78.

Figure 8:
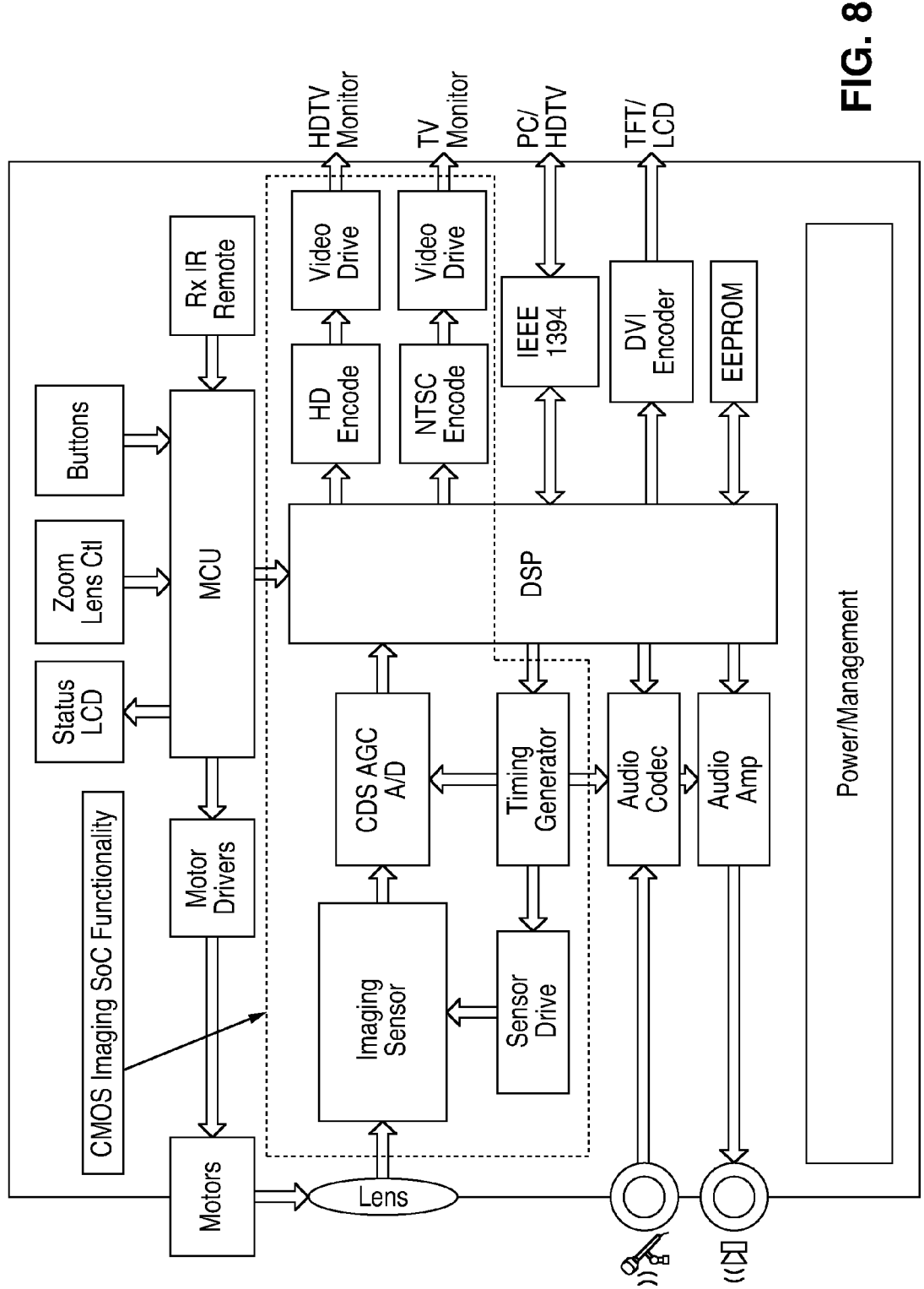
FIG. 8 is a block diagram of a digital video camera, in which the present invention can advantageously be applied.

FIG. 8 is a high-level block diagram of a type of digital video camera in which the present invention can advantageously be applied. The various blocks are briefly described below:

CMOS imaging SoC Functionality: Blocks including Imaging Array, CDS AGC A/D, Sensor Drive, Timing Generator, HD Encoder, NTSC Encoder, Video Drive and part of DSP that are often integrated into CMOS imaging System-on-Chip sensors.

Imaging Sensor: Solid-state cameras use imaging sensors that are fingernail-sized silicon chips containing millions of pixels with photosensitive diodes.

CDS AGC A/D: Used with analog imaging arrays, such as CCDs and some CMOS sensors, to process the analog video from the imaging sensor to reduce random noise using correlated double sampling (CDS), automatically control gain (AGC) to scale the signal seen by the A/D converter, and finally digitize the analog video (A/D) to produce a digital representation.

DSP/DMP: The digital signal processor or digital media processor performs various signal processing functions on the digitized video including color reconstruction, digital compression, noise reduction, etc.

Power/Management: Provides and manages camera power from line supply or battery.

Sensor Drive: This block provides all the voltages and clock waveforms needed to operate CCD-based imaging sensors. CMOS imaging sensors generally have this block integrated in the sensor including, in some cases, all that is needed to operate the sensor.

Timing Generator: Provides all the timing and clock signals to operate the various camera blocks.

HD Encoder: Encodes the video from the DSP to the standard SMPTE format required to display the video on high definition televisions.

NTSC Encoder: Encodes the video from the DSP to the NTSC format required to display the video on standard televisions.

Video Drive: Amplifies the video signals to the level needed for television display.

DVI Encoder: Serializes the video to the standard DVI format used in the latest digital televisions and personal computers.

EEPROM: Camera memory to non-destructively store camera setup and miscellaneous information.

Audio Codec: Digitizes, compresses and decompresses various audio signals including raw audio from microphone Audio Amp: Amplifies the audio signal to drive speaker.

MCU: The master control unit controls the camera and lens based on input from the user and scene information. Provides operating status to LCD monitor.

Zoom Lens Control: Controls zoom ratio of lens based on user input.

Buttons: Controls camera setup based on user input.

Motor Drivers: Control focus and zoom based on information provided by MCU

Motors: Lens motors appropriately adjust lens focus and zoom ratio.

Rx IR Remote: IR receiver provides user setup information to MCU to appropriately adjust camera operation from remote control unit.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. In a CMOS image sensor having a plurality of pixels, a column buffer having automatic gain control, the column buffer comprising:
   an amplifier connected to at least one pixel;
   a reference voltage; and
   a comparator connected to the reference voltage and an output of the amplifier;
   wherein the amplifier is first set to a first gain level, and if the output of the amplifier is below the reference voltage then a signal is output at the first gain level, otherwise if the output of the amplifier is above the reference voltage, then the amplifier gain is reset to a second level and the amplifier outputs a signal at the second gain level.

2. The column buffer of claim 1, wherein the first gain level is a high-gain level, and the second gain level is a low-gain level.

3. The column buffer of claim 2, wherein the low-gain level is a unity gain level.

4. The column buffer of claim 2, wherein the amplifier is an operational amplifier having a folded cascode architecture.

5. The column buffer of claim 4, wherein the comparator is an operational amplifier having a folded cascode architecture.

6. The column buffer of claim 2, further comprising a pixel charge storage capacitor connected to an input of the amplifier.

7. The column buffer of claim 6, further comprising a switched capacitor network connected to an input of the amplifier to set the gain level of the amplifier.

8. The column buffer of claim 7, wherein the comparator outputs a gain range output signal corresponding to the gain level set by the comparator.

9. The column buffer of claim 8, further comprising an output storage capacitor for storing an output of the amplifier.

10. The column buffer of claim 9, further comprising a latch to store the gain range output signal.

11. The column buffer of claim 1, wherein the amplifier has a plurality of gain levels that are set according to a comparison of an output signal with multiple reference voltages.

12. A CMOS image sensor having a plurality of pixels arranged in rows and columns, the image sensor comprising:
   a column buffer associated with each column of pixels and connected to the pixels via a column bus, the column buffer comprising:
   an amplifier connected to the column bus;
   a reference voltage; and
   a comparator connected to the reference voltage and an output of the amplifier, the comparator outputting a gain range output signal;
   wherein the amplifier is first set to a first gain level, and if the output of the amplifier is below the reference voltage then a signal is output at the first gain level, otherwise if the output of the amplifier is above the reference voltage, then the amplifier gain is reset to a second level and the amplifier outputs a signal at the second gain level.

13. The CMOS image sensor of claim 12, wherein the amplifier has a plurality of gain levels that are set based on a comparison of an amplified output signal with a plurality of reference voltages.

14. The CMOS image sensor of claim 12, further comprising a line driver, a programmable gain amplifier and an analog-to-digital converter connected to the column buffer output.

15. The CMOS image sensor of claim 14, further comprising a digital correction stage connected to the analog-to-digital converter to attenuate the amplified signal.

16. A digital video camera comprising:
   a CMOS image sensor having a plurality of pixel sensors arranged in rows and columns, the CMOS image sensor comprising:
   a column buffer associated with each column of pixels and connected to the pixels via a column bus, the column buffer comprising:
   an amplifier connected to the column bus;
   a reference voltage; and
   a comparator connected to the reference voltage and an output of the amplifier, the comparator outputting a gain range output signal;
   wherein the amplifier is first set to a first gain level, and if the output of the amplifier is below the reference voltage then a signal is output at the first gain level, otherwise if the output of the amplifier is above the reference voltage, then the amplifier gain is reset to a second level and the amplifier outputs a signal at the second gain level;

an analog-to-digital converter connected to an output of the amplifier; and a digital correction stage connected to an output of the analog-to-digital converter to attenuate the amplified signal.

17. The digital video camera of claim 16, further comprising a line driver connected between the column buffer and the analog-to-digital converter.

18. The digital video camera of claim 17, further comprising a programmable gain amplifier connected between the line driver and the analog-to-digital converter.

19. The digital video camera of claim 18, wherein the amplifier connected to the column bus has a plurality of gain levels.

20. The digital video camera of claim 19, wherein the column buffer is connected to a plurality of columns, such that an output from each column is multiplexed onto the column the buffer.

* * * * *